July 5, 1955
O. E. ANDRUS
2,712,325
IRRIGATION FLOW CONTROLLER
Original Filed July 21, 1947
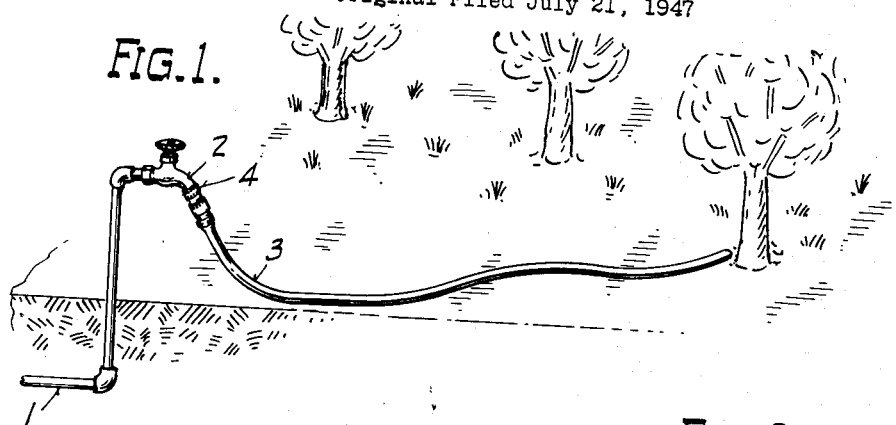
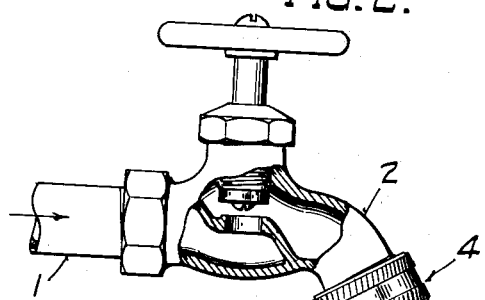
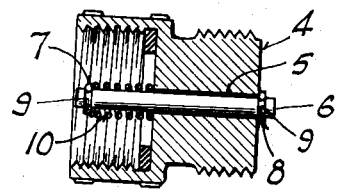
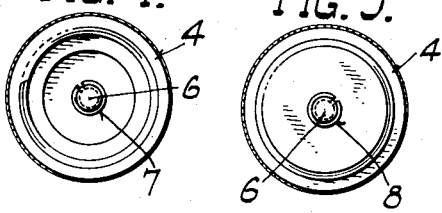
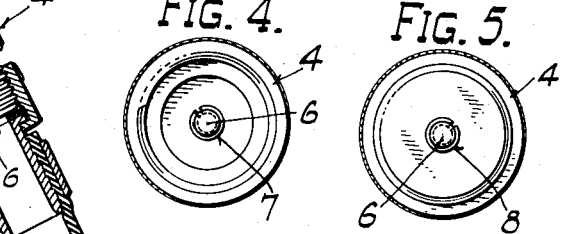
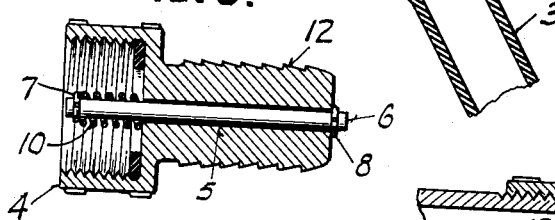
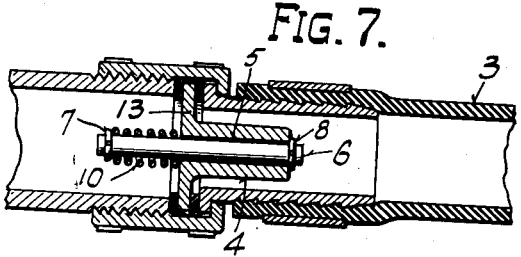
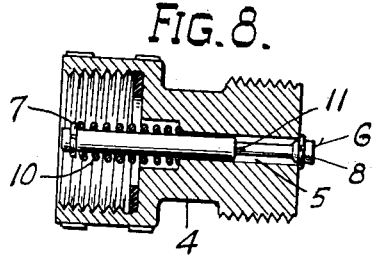
Orrin E. Andrus
INVENTOR.
BY
ATTORNEY.

United States Patent Office 2,712,325
Patented July 5, 1955

2,712,325
IRRIGATION FLOW CONTROLLER

Orrin E. Andrus, Milwaukee, Wis.

Continuation of abandoned application Serial No. 762,285, July 21, 1947. This application September 13, 1954, Serial No. 455,496

2 Claims. (Cl. 138—40)

This invention relates to an irrigation flow controller particularly useful in the watering of shrubs and trees in arid and semi-arid regions.

The present application is a continuation of application Serial No. 762,285, filed July 21, 1947, and now abandoned in favor of this application.

One of the principal objects of the invention is to provide an insert for a hose coupling and the like constituting a flow control for the water, eliminating the objectionable features of automatic sprinklers and of manual watering practices, and adapted to supply water to the ground beneath shrubs and trees at a rate corresponding more nearly to the diffusion rate of water in the soil, thereby preventing water wastage by undesirable run-off and drainage, and providing automatic continuous water supply without the requirement of substantial personal attention as is characteristic of the above-mentioned methods.

Another object of the invention is to provide an irrigation flow controller that will prevent undesirable leaching of fertilizer out of the soil around the roots of the plant by excess drainage of water washing through the soil.

Another object is to provide a means of producing deep penetration of water into the soil substantially coextensive with the root system of the plants being watered thereby stimulating deep and broad root systems.

Another object is to provide a means of conveniently applying water soluble fertilizer to the root system of a plant by solution of fertilizer in the water applied to the ground surface at one or more points thereby accomplishing a minimum loss of soluble fertilizer from excess use of water and from resultant drainage of fertilizer bearing water.

Another object is to provide an irrigating device and system that will facilitate gradual application of water to the soil over long periods of time to obtain more thorough and efficient moistening of relatively deep and large root growths.

Another object is to provide for a constant and very low flow rate of irrigation water from a hose and the like without closely adjusting or injuring the regular shut-off valve for the system.

Another object is to provide a fool-proof, simple, low-cost hose coupling insert that will deliver a fixed low-rate stream flow.

Another object is to provide a mechanism that will not readily become inoperative as a result of deposits built up at the exit end of the coupling.

Another object of the invention is to provide a flow control with all mechanism concealed inside against accidental and mischievous tampering and the like.

Another object is to prevent leakage of water externally of the coupling by enclosing all mechanism inside the coupling and the water passages of the connecting members.

Another object is to provide a flow control for irrigation and the like that can be readily cleaned from foreign matter therein without removing the device from the water supply line.

Another object is to provide a flow control for irrigation and the like that will tend to clean itself of foreign particles by means of fluctuations in the supply line pressure.

Another object of the invention is to provide a flow control for domestic irrigation of shrubs and trees that will not generate vibratory noises and transmit them to the plumbing system in the house.

Another object of the invention is to provide a substantially constant rate of flow regardless of fluctuations in the line pressure or variations in domestic water line pressures in different localities.

Other objects and advantages will be set forth in connection with the description of specific embodiments of the invention illustrated in the accompanying drawings.

In the drawings:

Figure 1 is a diagrammatic illustration of an irrigation system employing the present invention;

Fig. 2 is an enlarged view of the faucet and hose of Fig. 1 with the flow control coupling attached therebetween and the end of the hose sectioned and the faucet open;

Fig. 3 is an enlarged axial section of a flow control hose coupling;

Fig. 4 is an inlet view of the coupling of Fig. 3;

Fig. 5 is an outlet view of the coupling of Fig. 3;

Fig. 6 is an enlarged axial section of a flow control coupling having a modified hose attachment means;

Fig. 7 is a similar section illustrating a controller adapted to be secured inside a standard hose coupling; and Fig. 8 is an enlarged axial section of a flow control coupling having substantially constant flow characteristics.

Domestic irrigation systems for lawns, shrubs and trees in arid and semi-arid regions usually start with an underground water pipe 1 having a regular shutoff faucet or valve 2 at each outlet to which an ordinary garden hose 3 is attached.

The sprinkling of lawns is accomplished either by attaching a sprinkler on the end of the hose 3 and frequently moving the same to different locations on the lawn, or by attaching an adjustable spray nozzle to the hose and manually directing the same about the lawn. Such methods are generally unsuitable for watering shrubs and trees because of waste of time for the operator, waste of water, waste of fertilizer and inadequacy of distribution of water to encourage healthy root growth over a deep broad area. The manually directed spray nozzle requires constant personal attention and the sprinklers require timing and frequent changes in location to prevent excesses in under or over watering with consequent damage to plants and loss of water and fertility. When water is applied rapidly it tends to channel through the substratum with washing away of soluble fertilizers and with loss of water. If the ground is not level the penetration of water into the soil will be poor on high and sloping areas with possible channeling on low areas; in some cases soil erosion may result because of a sloping surface.

The present invention provides a simple low-cost flow rate controller 4 that can be applied between a faucet and a hose, between sections of a hose or at the exit end of a hose and which provides a constant small flow of water. A flow of water, such as one gallon per hour, when applied at one spot tends to be distributed through the soil by capillarity rather than by gravity. Such a rate controller may be allowed to apply a trickle at a fixed location for 24 hours or longer without waste of water or fertility.

The controller 4 may be placed at or near the inlet end of the hose 3 so that the major part of the hose does not have to carry water at high pressure. This enables the employment of less costly or less perfect hose for irrigating purposes.

The flow controller 4 may vary in construction both with respect to its mode of attachment and with respect to the orifice control.

In principle, the controller employs a circular orifice 5 with a floating central pin 6 extending therethrough.

The orifice 5 is preferably disposed centrally of the body of the controller coupling and may be of different lengths extending longitudinally of the coupling.

The bore of orifice 5 is cylindrical and the pin 6 is cylindrical to provide for uniform water pressures on all sides of the pin tending to center the same in the bore at all times, thereby reducing friction in the longitudinal movement of the pin and tending to effect lubrication of the latter by the water surrounding the same. This feature also prevents noise by preventing any tendency of the pin to strike the body.

The annular orifice should have dimensions that will pass less than ten gallons of water per hour when the device is employed with normal domestic water systems which usually vary from about 5 to about 100 pounds per square inch in pressure.

Where a single orifice without a pin is employed for this purpose the hole or bore has to be so small as to tend to clog from fine sediment always present in water systems. According to the present invention it has been found that by providing a bore of a practical length for a coupling body, such as ¾ inch, and providing an annular orifice by employing a floating pin within the bore, it is possible to obtain a desired flow up to substantially ten gallons of water per hour and at the same time provide for cleaning of the orifice.

In the construction of the device illustrated with a ¾ inch long orifice bore, a bore diameter of approximately .125 inch and a pin diameter of approximately .122 inch has been found to be most practical. This gives an annular orifice about .0015 inch thick between the adjacent walls of the bore and pin, and about 25/64 inch in circumference. The total cross-sectional area of the orifice is about .00059 square inch which is the area of about a .027 inch diameter hole. Such a hole would provide too great a flow, but the same cross-sectional area in an annular orifice as described will restrict the flow to a practical limit.

A washer in the form of a split ring 7 is secured on the inlet end of the pin by setting the same in a groove 9 near the end of the pin or by other suitable means. Similarly, a split ring 8 is secured on the discharge end of the pin in the same manner.

The split rings 7 and 8 constitute flanges on the pin and are spaced apart a greater distance than the length of orifice 5.

The flange 7 should be spaced from the inlet end of the orifice 5 at all times.

For this purpose the flange 7 is held away from the inlet end of orifice 5 by a coil spring 10 encircling the pin 6 and disposed between flange 7 and the body of coupling 4.

Spring 10 is preferably a light spring capable of providing a substantial range of movement for pin 6 under varying water pressures to give a cleaning effect for dislodging any sediment that might be caught in the orifice. It should fit loosely around the pin 6 so that it does not obstruct the flow of water to the inlet end of orifice 5.

The outlet end of the pin 6 extends from the end of body 4 when there is water pressure at the inlet end tending to compress spring 10.

To clean sediment away, it is only necessary to disconnect hose 3 from the coupling and manually press on the outlet end of pin 6 to dislodge the sediment and allow the same to be forced through the orifice by the flow of water therethrough. In case this procedure does not clean the orifice the faucet 2 should be closed and the coupling removed and cleaned.

A substantially constant flow of water under varying conditions of water pressure may be obtained by the construction shown in Fig. 8 wherein the effective length of the orifice varies with the water pressure.

The pin 6 of Fig. 8 is constructed with a substantial reduction in diameter at the discharge end providing a shoulder 11 about midway between the inlet and outlet, thereby substantially eliminating the resistance to flow after the water passes the shoulder 11.

The higher the water pressure the farther pin 6 moves the shoulder 11 toward the discharge end, thereby increasing the effective length of the orifice and the resistance to flow. The lower the water pressure the farther spring 10 will move the pin 6 and its shoulder 11 toward the inlet end, thereby decreasing the effective length of the orifice and the resistance to flow.

By properly constructing the orifice dimensions and providing a spring of proper strength and characteristics it is possible to obtain a flow which is substantially independent of water pressures within the range of pressures usually encountered in domestic water supply systems.

The pin 6, in most constructions of the controller should be only a few thousandths of an inch smaller than the orifice. For instance, where it is desired to pass only about one and one-half gallons of water an hour to a shrub or tree, and the water pressure is about fifty pounds per square inch, an orifice of the dimensions specifically stated above will be found satisfactory. The orifice actually has a radial clearance between its wall and the pin of only one and one-half thousandths of an inch. A clearance of less than one thousandth of an inch will generally be unsatisfactory.

The actual flow rate obtained may be fixed as desired by employing a pin having a diameter properly correlated to the diameter of the orifice or by providing different length orifices. A smaller pin or shorter orifice will give a greater flow rate and a larger pin or longer orifice will give a smaller flow rate. It is preferable to base the flow rate desired for any given shrub upon a 24-hour period of irrigation, or even a longer period. Usually ten gallons per hour will be the maximum required.

From a practical standpoint it is generally necessary to have an orifice length of at least ½ inch in order to provide a workable clearance between pin 6 and the bore in body 4. It is possible to provide an orifice of as much as one and a half inches long, particularly when employing the body of Fig. 6. In such case the clearance for the pin may be greater for the same water flow.

For practical purposes there is a proportion of the annular orifice length in inches to cross-section in square inches of between 100 as a minimum and 5,000 as a maximum, to obtain a delivery of from 10 gallons to 1 gallon of water per hour at normal domestic water system pressures of from 5 pounds per square inch to 100 pounds per square inch. At one extreme, with a proportion of about 100 the flow will be about 10 gallons per hour at 5 pounds pressure per square inch; and at the other extreme, with a proportion of about 5,000 the flow will be about 1 gallon per hour at 100 pounds pressure per square inch.

The controller 4 can be used wherever there is a coupling for the garden hose. Preferably, the controller 4 is threaded at both ends for threaded connections to the faucet and to the hose, or to two hose sections. In Figs. 1 to 5, and 8 the controller is shown as provided with a female thread at the inlet end and male thread at the discharge end for inserting the controller between hose coupling members. If desired the discharge end of the coupling may have a long corrugated end 12 for securing a hose directly thereto, as shown in Fig. 6.

The construction illustrated in Fig. 7 shows a controller with a smaller body having an annular flange 13 to fit inside the usual female hose coupling member and adapted to be secured as an insert between the shoulder of the female coupling member and the end of the male coupling member.

By employing an annular orifice with a floating pin that is balanced therein there is no vibration to produce undesirable noises in the piping system.

Various modes of carrying out the invention are contemplated as within the scope of the following claims particularly pointing out and distinctly claiming the subject matter which is regarded as the invention.

I claim:

1. A water flow controller for garden hose and the like, comprising a body adapted to be disposed between coupling members and having a transverse wall with an orifice extending axially therethrough, said wall having an axial thickness substantially greater than the diameter of said orifice, a floating pin disposed in said orifice extending axially to control the flow of water therethrough, and means operable in response to differential water pressure on the opposite sides of said orifice to control the movement and position of said pin, said body being of smaller diameter than the inside diameter of the coupling members and having an annular flange adapted to be clamped between the coupling members to secure the controller in place.

2. A soil wetting device for arid and semi-arid regions employing a water supply conduit connected to a source of water under pressures ranging from about five to about one hundred pounds per square inch and a distribution hose for transmitting water under substantially no pressure to a selected location for discharge on top of the soil, comprising a coupling adapted to connect the supply conduit to the distribution hose and having a closure body with a cylindrical bore extending longitudinally therethrough of a length exceeding about one-half an inch, a free floating cylindrical pin extending through said bore and having an annular orifice clearance therein of an order that will pass water at a rate of an order less than about ten gallons per hour, said annular orifice having a length to cross-section proportion of from about 100:1 to about 5,000:1, means carried by said pin at both ends thereof to retain the same against removal from said bore, and spring means carried by said pin between the inlet to said orifice and the adjacent retaining means to resist movement of the pin in the direction of water flow through the orifice, said spring means having characteristics providing for the floating movement of the pin axially of the orifice under varying water pressures at the orifice entrance to thereby aid in the automatic dislodging of sediment from the orifice and maintain the pin centered in the orifice bore, and the pin at the outlet end of the orifice extending freely from said closure body when water pressure is applied to the inlet end thereof to provide for manual movement of the pin when the distribution hose is uncoupled to additionally aid in dislodging sediment from the orifice.

References Cited in the file of this patent

UNITED STATES PATENTS

| | | |
|---|---|---|
| 707,712 | Nethery | Aug. 26, 1902 |
| 780,986 | Francis | Jan. 31, 1905 |
| 939,211 | Brown | Nov. 9, 1909 |
| 1,543,769 | Hewlett et al. | June 30, 1925 |
| 1,551,672 | Knollenberg | Sept. 1, 1925 |
| 1,848,531 | Lamb et al. | Mar. 8, 1932 |
| 2,144,228 | Penick et al. | Jan. 17, 1939 |
| 2,289,514 | Mastney et al. | July 14, 1942 |
| 2,324,402 | Kocher | July 13, 1943 |
| 2,402,729 | Buchanan | June 25, 1946 |
| 2,439,458 | Eaton | Apr. 13, 1948 |